The specification in this patent is not in print.
7496X
W. Whittemore & W. Whittemore, Jr.
Cotton Gin.
Patented Mar. 21, 1833.
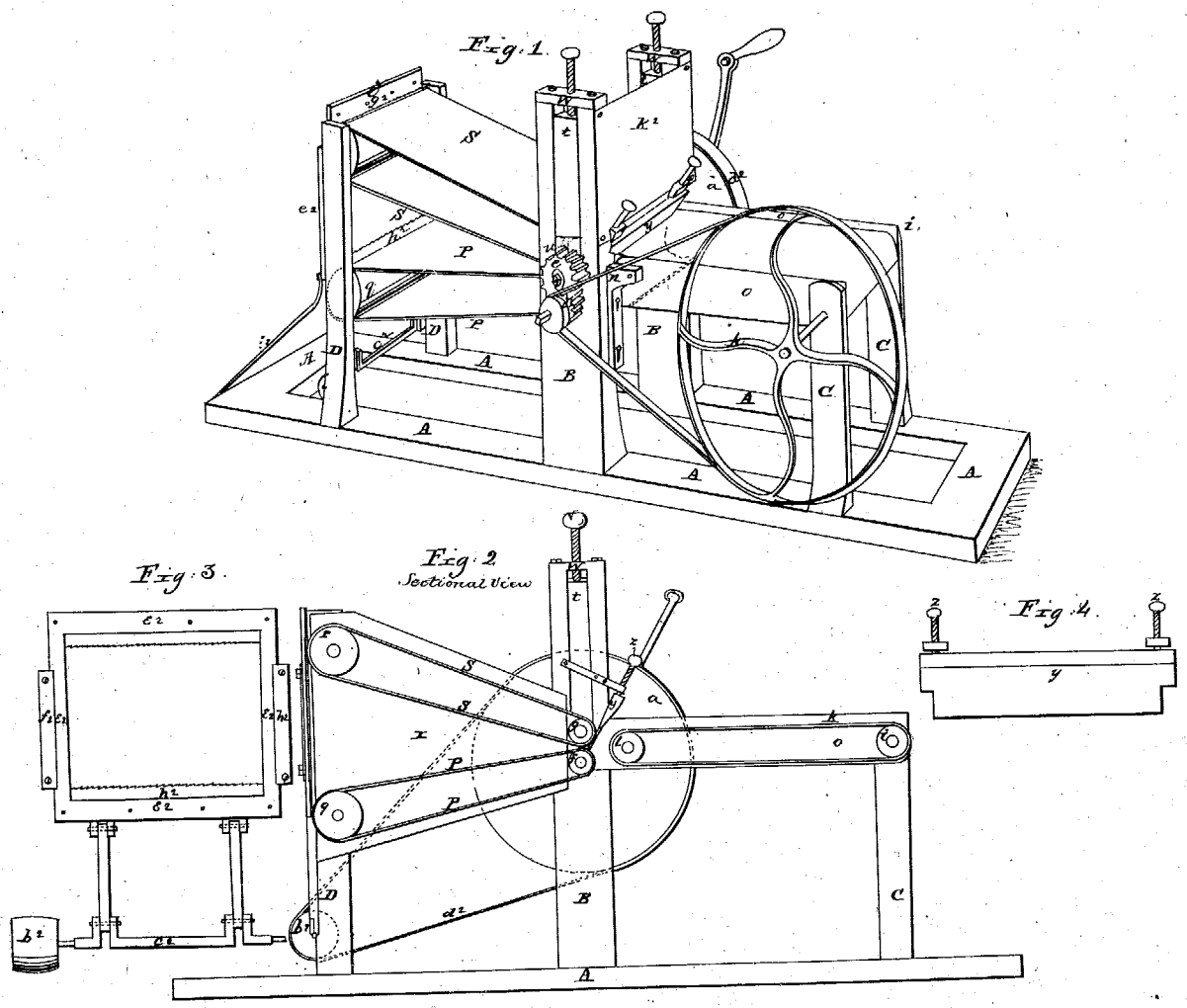
THE NORRIS PETERS CO., WASHINGTON, D. C.

7496x March 21, 1833 179

William Whittemore & William Whittemore jr
Letters Patent

The Schedule referred to in these Letters Patent and
making part of the same, containing a description in the
words of the said William Whittemore & Wm. Whittemore
jr. themselves of their improvement in the machine used for
separating the seeds from cotton commonly called the
roller Gin. To all to whom these presents shall come:
William Whittemore Esqr. & William Whittemore the
younger gentleman both of West Cambridge in the Coun-
ty of Middlesex & Commonwealth of Massachusetts
send greeting. Be it known that we the said Wil-
liam Whittemore and William Whittemore the younger
have invented made & applied to use a new and use-
ful improvement in the machine used for separat-
ing the seeds from cotton commonly called the roller
gin which invention & improvement is specified & des-
cribed as follows namely: The whole machine with the
improvements is represented in the figure No. 1 in the draw-
ing hereunto annexed as a part of this specification, &
figure No. 2 in the said drawing is a sectional view of the
said ..... machine, with the improvements & figure
No. 3 represents the cleaner herein after mentioned & the
double crank with its pulley connected therewith, & figure
No. 4 is the guard herein after mentioned with its thumb
screws. The improvements are colored with red ink.
AA is the bottom part of the frame of the machine which
may be of cast iron or any other substance sufficiently
strong. When constructed of iron it may be made
about twenty six inches & an half in length and about
nine inches in width from outside to outside and twen-
ty three inches and an half in length and six inches
in

[illegible] 7496X March 21, 1833 in width from inside to inside. B. B. are the middle
posts made of iron or other suitable substance & when of
iron are about eleven inches & 7/8^ths of an inch in height &
about two inches & 3/4 of an inch wide, and about 3/4^ths of an
inch thick, having slots at the upper ends about nine
inches in length & 3/4^ths of an inch wide. C. C. are posts
of iron or other suitable material & when of iron may be
made about eight inches and three sixteenths wide, (and
about one half of an inch thick excepting near the bot-
tom where they are a little thicker, so as to form a shoul-
der and be more firm. D. D. are posts of iron or other
suitable material, & when of iron are about eleven inches
& one eighth of an inch in height & about one eighth of an
inch in width. and about one half of an inch thick at
the top. The posts B & C. may be about eight inches apart
and the posts B. B. may be six and a half inches apart.
A. is a band wheel of hard wood or it may be of iron or
other suitable material which wheel is about six inches
& seven eighths of an inch in diameter & about one inch
thick fixed on the shaft extending from the journal of
the lower roller f. which shaft passes thro' the centre of
said wheel, at the end of which shaft a crank b is fix-
ed to turn the machine. The lower roller f. above referred
to turns in journals in the posts B. B. & may be of cast
iron, steel or other suitable substance & when of iron may
be in length between the posts about seven and a half
inches & in diameter about fifteen sixteenths of an inch & may
be longer when the machine is proportionally larger—
On the shaft at the opposite end of this roller is fixed a
pinion wheel c about one & a quarter inch in diameter
& about seven eighths of an inch wide having twelve teeth,
& a pulley d. about one inch & seven sixteenths of an inch
in diameter. e. is a pinion wheel on the shaft of the
upper upper roller S. of the same dimensions with the other pinion wheel into which the teeth play. The upper metallic roller of the same length between the posts & of the same diameter as that before described and is immediately above it. h. is a band wheel of wood, iron or other suitable substance. & this wheel is about nine inches in diameter & about one inch thick & is fixed on the shaft of the roller i, in order to turn the same & give motion to the endless cloth which cloth passes over the rollers i & l; said band wheel is moved by a band passing over it & the pulley d. fixed to ... shaft of the lower roller The roller i. is made of hard wood & this roller may be made about an inch & one quarter in diameter & seven & one quarter inches in length between the posts and is covered with sand paper to prevent the cloth from slipping upon it, & has iron or metallic gudgeons inserted at the ends which turn in the posts. C.C. —

The roller l. is of hard wood, ^alder which is deemed best for these rollers l & i, & may ... be about an inch & three eighths of an inch in diameter, so as to move a little slower than the roller last mentioned, & is of the same length, & covered with sand paper like that. & has iron or metallic gudgeons in the ends which turn in struts fixed to the posts B, B. & is moved by the endless cloth or felt K stretched tightly over it. This roller l. with the cloth stretched upon it comes within about one half of an inch of the under roller f with the felt upon it but the centre of the roller l, is higher than the centre of the roller f. & is on a line with the central point between the rollers f & S. & the struts in which the journals of the roller l. turn are so constructed as to be raised or lowered and fixed so as raise or lower that roller l. at pleasure in order that it may come nearer, or be further from the roller f in such man- 7496x March 21, 1833 ner, that the cotton may be drawn in more readily between
the rollers f & g. O.O. are pieces of sheet copper, tin, or
iron about two inches and one eighth of an inch on the in-
side from the posts C. to the struts n. n. and come up about
one half of an inch above the cloth or felt. which are held
up by the gudgeons of the rollers i & l. & serve to prevent the
cotton placed on the endless cloth k. from falling from
the side of it. q. r. are wooden rollers having iron
gudgeons at the ends turning in the posts D.D. one above
the other & about five inches & one eighth of an inch .. apart
from the centers of the gudgeons. .. These rollers are about
one and five sixteenths of an inch in diameter & about seven inches &
three eighths of an inch long between the posts & are cov-
ered with sand paper to prevent the felt from slipping
upon them. — The centers of the gudgeons of the roller g.
are a little below the center of the arbor of the roller f. be-
fore mentioned & the centre of the gudgeons of the roller r. is
about three inches above the center of the arbor of the roller g.
q Over the rollers q & f is an endless piece of felt paper which
q gives motion to the roller q and over the rollers r & g. is
also a like piece of felt S.S. tightly stretched which gives
motion to the roller r. The roller g. with the felt passing
over it bears upon the roller f, with the felt passing over
it. t. t. are pieces of hard wood, movable upward &
downward in the slots in posts B.B. & resting upon boxes
u. u. adjusted to the journals of the upper roller g. and
regulated by thumb screws V.V. passing thro'.. the iron
caps W.W. so as to press the rollers f. & g. together and
cause them to bear upon each other sufficiently to draw
in the cotton placed upon the endless cloth k. X.X. are
pieces of sheet iron, copper or tin on the inside of the posts
D. D. and extending from the posts D. D. to the posts B.B.
& to the rollers f. g. & held up by the gudgeons of the roller g which pass thro' them: the pieces of sheet copper, tin or tin come
above and extend below the endless felt 3.3. & p.p. which serve
to prevent the cotton from falling from the sides of the felt. Y is a
guard (made of cast steel, about seven & seven eighths inches long)
& one & seven eighths of an inch wide & one fourth of an inch thick at
top and tapering down to about one sixteenth of an inch & rounded
& polished at the edge, so as not to cut or tear the staple of the cotton.
Which guard is fitted ~~into~~ grooves cut obliquely in the inside of
the posts B.B. so that the lower edge may come within about one six-
teenth of an inch of the felt, upon the (lower) roller and regulated by ad-
justing screws Z.Z. passing thro' pieces of brass attached by screws to the
inside of the posts B.B. (and screwing into the guard. The lower edge
of the guard ought to be made to come as near as conveniently
may be to the place of bearing of the upper roller g. on the lower
roller f. and ought not much to exceed a quarter of an inch
in distance from it in order that the staple of the cotton may
not be much broken or injured by it. the object of the guard
being to prevent the seeds of the cotton from going between
the rollers while the cotton is being drawn between the rollers &
thereby to separate the seeds from the cotton. The guard should be
placed in grooves making an angle of about from fifteen to twenty
degrees with the upright posts B.B. b² is a pulley fixed to
the double crank c² which receives its motion from a band
passing over it & the wooden wheel a. The double crank c² has
journals at each end turning in bearings in the posts D.D
& boxes fixed thereto which crank is connected to the frame of
the cleaner c² in such manner as on being turned to move it up
and down. The frame of the cleaner moves up and down
in grooves formed by pieces of metal f.² f.² attached by screws to
the posts D.D. The frame is about ~~four~~ seven inches & five eighths of
an inch one way (and about seven and one half inches the other
way. On the upper [illegible] part of the frame of the cleaner upon the in-
side are attached by screws rows of comb plates of steel so that
when when the cleaners move up and down by the double cranks, the
serrated edge of the upper comb plate may pass above & below the
center of the upper roller r. & the serrated edge of the lower comb
plate may pass above & below the center of the lower roller g.
& that these comb plates may pass so near to their respective rol-
lers as to remove the cotton from the felt as it passes along from between
the rollers f & g. $i^2$ is a piece of sheet copper, iron, or tin
fastened by the upper end to the lower screws of the pieces of met-
al $f^2$ $f^3$ and extending obliquely down, so that the lower edge may
rest on the end of the frame A. to receive and convey off the cotton after
it comes or is removed from the felt. $K^2$. is a piece of sheet
copper, tin or iron placed above the upper edge of the guard, to
prevent the cotton from passing over the top of the guard, in case it
be clogged up by the carelessness of the operation. The cotton is
placed upon the endless cloth k. and by its motion, when the ma-
chine is in operation is carried to the lower roller f. & passes
between that and the guard Y. & thence between the rollers f. & g.
which assist in drawing the cotton under the guard, whereby the
seeds are separated from it, & the cotton being separated from the
seeds, then passes from between said rollers. along the endless felt
P. principally, some small parts of it only, passing on the end-
less felt S. from which felt it is removed by the comb plates
or cleaners $h^2$ & $g^2$ & passes off on the sheet copper, tin or iron $i^2$
Felt is used over these rollers B. & r. & f. & g. in preference to cloth be-
cause it is rougher and will retain a better hold on the cotton, & is
also more compact and will not stretch so much and can also
be put on in one piece & is more durable than cloth. The ma-
chine may be turned by the hand, or driven and carried by water
steam, or horse power, or any sufficient force. The length of the
rollers, in the above described machine, are made to correspond
nearly with those in common use, in the roller gin. but by the
use of the felts above described in the manner before mentioned,
cast steel or other metallic rollers may be used with greater
advantage 7496X March 21, 1833 advantage, which being much firmer, stronger, & less liable to spring than those of wood, may be made much longer than those in common use, & on this account will be preferable. The felt serves also better to draw in the cotton than the rollers alone, & to carry it off from between the rollers after it had passed thro' so that the rollers may not be clogged therewith as happens some times in the common roller gin. The cleaner is designed to remove the cotton from these felts after it has passed thro' & been carried from the rollers & to prevent its passing round on the felts & coming again to the rollers to clog them. The office of the guard is as before mentioned to prevent the seed from coming to the rollers when they bear upon each other as in the common roller gin and thereby more effectually to prevent them from passing thro' these rollers. It is to be understood that we do not claim ... the rollers, frame, screws, wheels, copper, tin & iron plate, pulleys or anything heretofore in common use for the purposes aforesaid, & that what we hereby claim & all which we claim as new and as our invention & improvement is the guard, felts, & cleaner above described when used in the manner and for the purposes aforesaid & the use thereof in the manner and for the purposes aforesaid. In testimony whereof we have hereto set our hands this tenth day of March in the year of our Lord eighteen hundred and thirty three Witnesses
Augustus H. Fiske
Wm Rand.

William Whittemore
William Whittemore Jr (2664 words)

Granted March 21. 1833
[illegible] in [illegible] folio

[illegible] & [illegible] [illegible] Apl 25. 1834. —